United States Patent
Kong et al.

(10) Patent No.: US 9,478,801 B2
(45) Date of Patent: Oct. 25, 2016

(54) LITHIUM METAL OXIDE COMPOSITE FOR LITHIUM SECONDARY BATTERY, METHOD FOR PREPARING THE SAME, AND LITHIUM SECONDARY BATTERY INCLUDING THE SAME

(71) Applicant: Samsung SDI Co., Ltd., Yongin-si, Gyeonggi-do (KR)

(72) Inventors: Young Sun Kong, Ulsan (KR); Doo Kyun Lee, Ulsan (KR); Ki Tae Kim, Ulsan (KR); Jae Ha Shim, Ulsan (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 159 days.

(21) Appl. No.: 14/057,537

(22) Filed: Oct. 18, 2013

(65) Prior Publication Data
US 2014/0113190 A1 Apr. 24, 2014

(30) Foreign Application Priority Data
Oct. 18, 2012 (KR) .................. 10-2012-0116227

(51) Int. Cl.
| | |
|---|---|
| H01M 4/131 | (2010.01) |
| H01M 4/1391 | (2010.01) |
| H01M 4/36 | (2006.01) |
| C01D 15/02 | (2006.01) |
| H01M 4/505 | (2010.01) |
| H01M 4/62 | (2006.01) |
| H01M 4/525 | (2010.01) |
| H01M 10/0525 | (2010.01) |

(52) U.S. Cl.
CPC .............. *H01M 4/366* (2013.01); *C01D 15/02* (2013.01); *H01M 4/505* (2013.01); *H01M 4/62* (2013.01); *H01M 4/622* (2013.01); *H01M 4/131* (2013.01); *H01M 4/525* (2013.01); *H01M 10/0525* (2013.01); *Y02E 60/122* (2013.01)

(58) Field of Classification Search
None
See application file for complete search history.

(56) References Cited

U.S. PATENT DOCUMENTS

2008/0193841 A1  8/2008  Sun et al.

FOREIGN PATENT DOCUMENTS

| CN | 101447566 A | * 6/2009 | ............. Y02E 60/12 |
| CN | 102751470 | * 10/2012 | .......... H01M 4/1391 |
| KR | 10-0674287 B1 | 1/2007 | |

OTHER PUBLICATIONS

Machine translation of CN 102751470, retrieved from <http://worldwide.espacenet.com/?locale=en_EP> on Jul. 6, 2015.*

(Continued)

*Primary Examiner* — Cynthia L Walls
(74) *Attorney, Agent, or Firm* — Lee & Morse, P.C.

(57) ABSTRACT

A lithium metal oxide composite for a lithium secondary battery includes a core portion formed of a Mn metal compound and a shell portion formed of a three-component system metal compound at an outside of the core portion. A method of preparing a lithium metal oxide composite for a lithium secondary battery includes: mixing an Mn metal salt aqueous solution, a chelate agent, and a pH regulator to precipitate a first precursor; thermally treating the obtained first precursor; mixing the thermally treated first precursor with a three component system metal salt aqueous solution, a chelate agent, and a pH regulator to precipitate a second precursor; and mixing the obtained second precursor with a lithium-containing compound to synthesize a powder via a firing.

13 Claims, 2 Drawing Sheets

(56) References Cited

OTHER PUBLICATIONS

Machine translation of CN 101447566, retrieved from <http://worldwide.espacenet.com/?locale=en_EP>, on Feb. 18, 2016.*

Office Action issued in corresponding Korean Application No. 10-2012-0116227 dated Feb. 27, 2014 (6 pages).

B. J. Hwang et al., LiMn2O4 Core Surrounded by LiCoxMn2-xO4 Shell Material for Rechargeable Lithium Batteries, Journal of the Electrochemical Society, 2002, 149 A694-A698 (5 pages).

* cited by examiner

LITHIUM METAL OXIDE COMPOSITE FOR LITHIUM SECONDARY BATTERY, METHOD FOR PREPARING THE SAME, AND LITHIUM SECONDARY BATTERY INCLUDING THE SAME

CROSS-REFERENCE TO RELATED APPLICATIONS

This application claims the foreign priority benefit of Korean Application No. 10-2012-0116227 filed Oct. 18, 2012, the contents of which are incorporated herein by reference.

BACKGROUND

1. Field

Embodiments relate to a lithium metal oxide composite for a lithium secondary battery, a method for preparing the same, and a lithium secondary battery including the same. More specifically, embodiments relate to a lithium metal oxide composite for a lithium secondary battery, containing a core portion of a manganese metal compound and a shell portion of a three-component system metal compound, a method for preparing the same, and a lithium secondary battery including the same.

2. Description of the Related Art

With the development, and miniaturization and lightweight requirements of portable devices, such as a mobile phone, a camcorder, and a notebook computer in these days, enhancement of characteristics, such as high capacity, long life cycle and high stability for a lithium secondary battery used as a power source for such devices are demanded. Also, as interests on electrification of vehicles increase, use of a lithium secondary battery is being magnified as a strong alternative for a power source of an electric vehicle.

A lithium secondary battery generally includes a positive electrode and a negative electrode to which lithium ions are inserted or from which lithium ions are deinserted, a separator preventing a physical contact between the positive electrode and the negative electrode, and an electrolyte transporting lithium ions. The lithium secondary battery generates electricity by electrochemical oxidation and reduction reactions while lithium ions are inserted into the positive electrode and the negative electrode or are deinserted from the positive electrode and the negative electrode.

As applications for a lithium secondary battery expand, development of a positive electrode active material is in progress. A positive electrode active material is typically prepared by mixing a manganese (Mn)-based lithium metal oxide of which stability is secured and a three-component system metal lithium metal oxide with a high capacity at a proper ratio. While the above-described method of mixing the lithium metal oxide at a proper ratio may secure high capacity and stability, the shape of particles is deformed or the distribution of particles is changed, so that an energy density per volume, or durability of the battery may be reduced.

SUMMARY

An aspect of the present invention provides a lithium metal oxide composite for a lithium secondary battery, which may be formed in a single form of a core portion of a Mn metal compound and a shell portion of a three-component system metal compound to thus secure high capacity and stability together, and may not cause a change in shape or distribution of particles to enhance an energy density per volume, a life cycle characteristic, and durability.

Another aspect of the present invention provides a method of preparing a lithium metal oxide composite for a lithium secondary battery.

Another aspect of the present invention provides a lithium secondary battery including a lithium metal oxide composite therefor.

According to at least one of embodiments, a lithium metal oxide composite for a lithium secondary battery includes a core portion made of a Mn metal compound and a shell portion formed of a three-component system metal compound at an outside of the core portion.

The Mn metal compound of the core portion may include one or more selected from the group consisting of $Mn(OH)_2$, $MnCO_3$, $MnO$, $MnO_2$ and $Mn_2O_3$. The three component system metal compound of the shell portion may be expressed by a formula of $Mn_xNi_yM_z(OH)_2$ (where $0 \leq x \leq 1$, $0 \leq y \leq 1$, $0 \leq z \leq 1$, M=Co, Zr, Al, Mg, Ag, or Mo).

The core portion may be shaped in a needle.

A ratio of a thickness of the core portion to a thickness of the shell portion may be in a range of 1:0.1 to 1:10.

A weight ratio of the Mn metal compound to the three component system metal compound may be in a range of 1:0.5 to 1:20.

The core portion may further include a surface coating layer made of polysaccharide or carbon black.

According to another embodiment, a method of preparing a lithium metal oxide composite for a lithium secondary battery, the method includes: mixing a solution containing an Mn metal salt aqueous solution, a chelate agent, and a pH regulator to precipitate a primary precursor; thermally treating the obtained primary precursor; mixing the thermally treated primary precursor with a three component system metal salt aqueous solution, a chelate agent, and a pH regulator to precipitate a secondary precursor; and mixing the obtained secondary precursor with a lithium-containing compound to synthesize a powder via a firing.

The thermal treating may be performed at a temperature ranging from 200° C. to 400° C.

The above method may further include coating a surface of the primary precursor followed by the thermally treating of the primary precursor.

The surface coating may be performed by coating the primary precursor with polysaccharide or carbon black.

According to another embodiment, a lithium secondary battery includes a lithium metal oxide composite for a lithium secondary battery.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Figure 1:
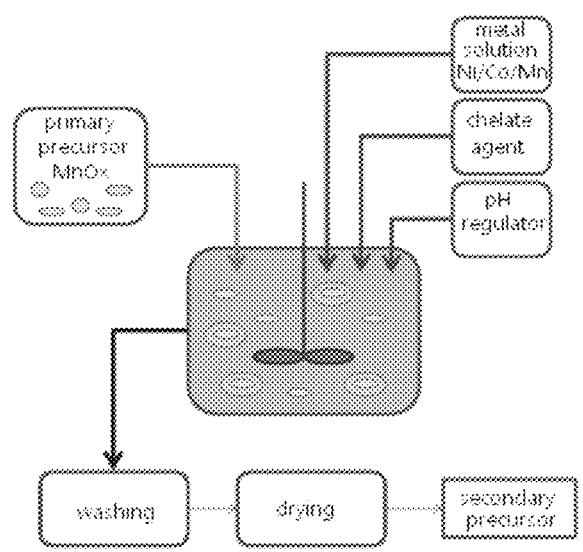
FIG. 1 is a schematic diagram showing a method of preparing a lithium metal oxide composite for a lithium secondary battery according to an embodiment of the present invention.

Korean Patent Application No. 10-2012-0116227 filed on Oct. 18, 2012, in the Korean Intellectual Property Office, and entitled: "LITHIUM METAL OXIDE COMPOSITE FOR LITHIUM SECONDARY BATTERY, METHOD FOR PREPARING THE SAME, AND LITHIUM SECONDARY BATTERY INCLUDING THE SAME" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, embodiments will be described in detail with reference to the accompanying drawings.

According to at least one of embodiments, a lithium metal oxide composite for a lithium secondary battery includes a core portion made of a Mn metal compound and a shell portion formed of a three-component system metal compound at an outside of the core portion.

The Mn metal compound of the core portion may be one of lithium metal oxides used for a typical lithium secondary battery, and may include one or more selected from the group consisting of $Mn(OH)_2$, $MnCO_3$, $MnO$, $MnO_2$ and $Mn_2O_3$. The core portion functions as a seed for the shell portion, is preferably shaped in a needle because lithium (Li) ion has a short diffusion radius, or may be shaped in a sphere or ellipse if the core portion is small in size.

The three component system metal compound of the shell portion may be one of lithium metal oxides used for a typical lithium secondary battery, and may be preferably one expressed by a formula of $Mn_xNi_yM_z(OH)_2$ (where $0 \leq x \leq 1$, $0 \leq y \leq 1$, $0 \leq z \leq 1$, M=Co, Zr, Al, Mg, Ag, or Mo).

The present invention provides a lithium metal oxide composite in which a ratio of a thickness of the core portion to a thickness of the shell portion is in a range of 1:0.1 to 1:10. If the thickness ratio is within the above-described range, a lithium metal oxide composite that secures both stability of the Mn metal compound in the core portion and high capacity of the three component system metal oxide in the shell portion may be obtained and thus is preferable.

In the lithium metal oxide composite of the present invention, a weight ratio of the Mn metal compound of the core portion to the three component system metal compound of the shell portion is preferably in a range of 1:0.5 to 1:20, more preferably in a range of 1:1 to 1:10. Within the above-described weight ratio, the core portion and the shell portion are neither mixed nor disordered, but are arranged in a regular configuration, and may stably form a phase. Therefore, the shell portion may be stably formed to thus secure high capacity characteristic and stability at the same time.

The lithium metal oxide composite of the present invention may further include a surface coating layer made of polysaccharide or a carbon black on a surface of the core portion. The surface coating layer may be coated on a surface of the core portion while the lithium metal oxide composite is prepared, to enhance chemistry resistance, thus allowing the core portion to maintain a stable shape in the next precipitation operation, and allowing a final product to secure stability in shape, grain size, and composition.

According to another embodiment, a method of preparing a lithium metal oxide composite for a lithium secondary battery, the method includes; mixing a solution containing an Mn metal salt aqueous solution, a chelate agent, and a pH regulator to precipitate a primary precursor; thermally treating the obtained primary precursor; mixing the thermally treated primary precursor with a three component system metal salt aqueous solution, a chelate agent, and a pH regulator to precipitate a secondary precursor; and mixing the obtained secondary precursor with a lithium-containing compound to synthesize a powder via a firing.

According to the present invention, since a pH range for occurrence of precipitation varies according to the type of precursors, after a primary precursor is formed, a secondary precursor is prepared without a change in shape during a reprecipitation to finally obtain a positive electrode active material containing two or more components and having a single form.

In the present invention, the pH may be regulated according to the types and contents of chelate agents and pH regulators. The pH regulator may include NaOH, KOH, or a combination thereof, and the chelate agent may include an ammonia aqueous solution, an ammonium sulfate aqueous solution, or a combination thereof.

The preparing method of the present invention may include thermally treating the primary precursor at a temperature ranging from 200° C. to 400° C. If the thermally treating temperature is within the above-described range, a lithium metal oxide able to enhance an energy density per volume, stability and durability of a battery may be obtained and thus is preferable.

The preparing method of the present invention may further include coating a surface of the primary precursor with polysaccharide or carbon black, followed by the thermally treating of the primary precursor. For example, the surface coating layer may be formed by mixing the primary precursor with 1-10 wt % of polysaccharide or carbon black, uniformly distributing the polysaccharide or carbon black on a surface of the precursor via a high speed rotation, and drying at a temperature of not less than 80° C.

By treating the primary precursor via the surface coating such that the primary precursor is not redissolved in a next precipitation operation, phase stability may be secured. That is, by coating the surface of the precursor, chemistry resistance of the precursor may be enhanced, thus allowing the precursor to maintain a stable shape in the next precipitation operation, and allowing a final product to secure stability in shape, grain size, and composition.

The secondary precursor prepared in the present invention may be mixed with a lithium-containing compound to thus obtain a lithium metal oxide composite.

The lithium containing compound may be one of compounds typically used for the positive electrode active material for a lithium secondary battery, and may include one or more selected from the group consisting of, for example, lithium hydroxide, lithium carbonate, lithium nitrate, and acetic acid lithium.

A mixing molar ratio of the lithium-containing compound to the secondary precursor is preferably in a range of 1:1 to 2:1, more preferably in a range of 1.1:1 to 1.5:1. If the mixing molar ratio of the lithium-containing compound and the secondary precursor is within the above-described range, the lithium-containing compound maintains stability and exhibits a maximum capacity, but if the mixing molar ratio of the lithium-containing compound and the secondary precursor is not within the above-described range, the content of lithium is insufficient or excessive, so that a final product may be deformed in a unwanted structure.

The present invention provides a lithium secondary battery including a lithium metal oxide composite.

The lithium secondary battery generally includes a positive electrode, a negative electrode, and an electrolyte.

The electrodes used in a lithium secondary battery are generally prepared by mixing an active material, a binder and a conductive material with a solvent to form slurry, coating the slurry on an electrode collector, and then drying and pressuring the coated slurry.

Since the lithium secondary battery of the present invention uses the lithium metal oxide composite of the present invention as a positive active material, stability, capacity, energy density per volume, durability, life cycle characteristics are enhanced.

A negative electrode active material for a lithium secondary battery of the present invention may include, but be not limited to, natural graphite, artificial graphite, carbon fiber, cokes, carbon black, carbon nanotube, fullerene, activated carbon, a lithium metal, or a lithium alloy.

The collector for a lithium secondary battery function to collect electrons by an electrochemical reaction of an active material or to supply electrons necessary for an electrochemical reaction.

A negative electrode collector is not particularly limited if it does not cause a chemical change in a battery and has conductivity, and may include aluminum (Al), copper (Cu), nickel (Ni), titanium (Ti), plastic carbon, Cu or stainless steel of which surface is treated with C, Ni, Ti, Ag, or the like, and an aluminum-cadmium (Al—Cd) alloy.

A positive electrode collector is also not particularly limited if it does not cause a chemical change in a battery and has conductivity, and may include stainless steel, Al, Ni, Ti, plastic carbon, and Al or stainless steel of which surface is treated with C, Ni, Ti, Ag, or the like.

By forming fine unevenness in surfaces of these collectors, it may be possible to reinforce the adhesive force of the electrode active materials, and various forms, such as a film, a sheet, a foil, a net, a porous body, a foaming body, a non-woven body, or the like may be used to reinforce the adhesive force of the electrode active material.

The binder functions to allow an active material to accrete to a conductive material, and thus to be fixed to the collector, and may include those used in a lithium secondary battery, such as polyvinylidenefluoride, polypropylene, carboxymethyl cellulose, starch, hydroxypropylenecellulose, polyvinylpyrrolidone, tetrafluoroethylene, polyethylene, ethylene-propylene-diene polymer (EPDM), polyvinylalcohol, styrene-butadiene rubber, fluorine rubber, and the like.

The conductive material is not particularly limited if it does not cause a chemical change in a battery and has conductivity, and may include, for example, artificial graphite, natural graphite, denka black, acetylene black, ketchen black, channel black, ramp black, summer black, a conductive fiber such as a carbon fiber or a metal fiber, a conductive metal oxide such as titanium oxide, a metal powder such as aluminum powder or nickel powder, and the like.

The electrolyte of the lithium secondary battery is a medium enabling ion transport between the positive electrode and the negative electrode, and may be an organic electrolyte containing an organic solvent and a lithium salt dissolved in the organic solvent.

The lithium salt may include lithium salts typically used in a lithium secondary battery. The lithium salt may include, for example, $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and the like, and these salts may be used alone or in combinations thereof within a range that does not damage the effects of the present invention.

The organic solvent is also not particularly limited if it is generally usable in a lithium secondary battery. The organic solvent may include, for example, ethylene carbonate, propylene carbonate, dimethyl carbonate, diethyl carbonate, methylpropyl carbonate, ethylpropyl carbonate, methylethyl carbonate, butylene carbonate, dimethyl sulfoxide, acetonitrile, dimethoxyethane, and diethoxy ethane, and these solvents may be used alone or in combinations thereof within a range that does not damage the effects of the present invention.

The lithium secondary battery of the present invention may include a separator. The separator is a porous membrane between the positive electrode and the negative electrode, and functions to prevent a shortage between the two electrodes and functions as a pathway for ion transport. The separator is not particularly limited, but may include a single olefin such as polyethylene (PE) and polypropylene (PP), a composite of olefin, polyamide (PA), poly(acrylonitrile) (PAN), poly(ethylene oxide) (PEO), poly(propylene oxide) (PPO), poly(ethylene glycol) diacrylate (PEGA), polytetrafluoroethylene (PTFE), polyvinylidene fluoride (PVdF), polyvinylchloride (PVC), and the like.

The lithium secondary battery according to the present invention may be prepared by a typical method publicly known in the art. Also, the lithium secondary battery may have a shape typically used in a lithium secondary battery, such as a coin shape, a button shape, a sheet shape, a cylindrical shape, a planar shape, and a polygonal shape.

Hereinafter, description will be provided in more detail with reference to examples, but the present invention will not be limited thereto.

EXAMPLES

Example 1

Figure 2:
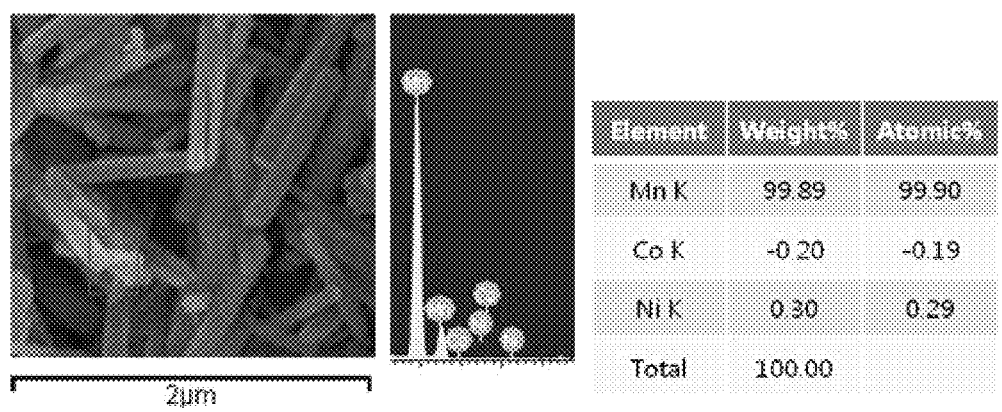
FIG. 2 shows a SEM photograph of a primary precursor prepared in Example 1 of the present invention and an energy dispersive X-ray spectroscopy (EDS) result for identifying a metal distribution in a cut surface of the primary precursor.

50 mM of a manganese salt aqueous solution, 50 mM of an ammonium persulfate, and 10 mM of potassium hydroxide were mixed to obtain a mixture, and pH of the mixture was regulated to 5 to precipitate a manganese oxide ($MnO_2$) shaped in a needle. The precipitate was washed with water and dried to synthesize a primary precursor (see FIG. 2). The primary precursor prepared as above was thermally treated at 300° C. Thereafter, the thermally treated primary precursor was mixed with 100 mM of an aqueous solution containing a manganese salt, a nickel salt, and a cobalt salt, and 20 mM of an ammonia aqueous solution to obtain a mixture, and then pH of the obtained mixture was regulated to 10 to 11 by NaOH to precipitate a secondary precursor having a core-shell structure of which a thickness ratio of a core portion to a shell portion is 1:5 and a weight ratio of a manganese metal compound of the core portion to a three component system metal compound of the shell portion is 1:10 (see FIGS. 3 and 4). The secondary precursor obtained as above was washed with water and then dried. $Li_2CO_3$ and the secondary precursor were mixed in a molar ratio of 1.5:1 to obtain a mixture, and the obtained mixture was fired for 12 hours at 850° C. to synthesize a lithium metal oxide composite.

Figure 3:
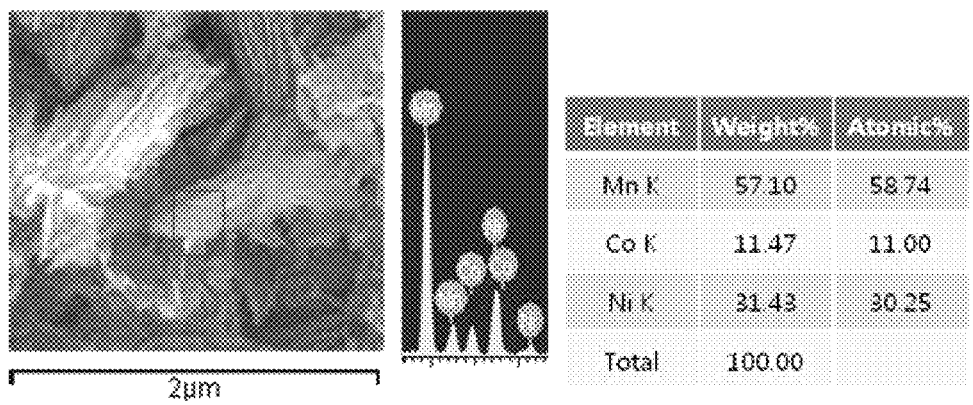
FIG. 3 shows a SEM photograph of a secondary precursor prepared in Example 1 of the present invention and composed of a core portion and a shell portion, and an EDS result for identifying a metal distribution in a cut surface of the secondary precursor.
Figure 4:
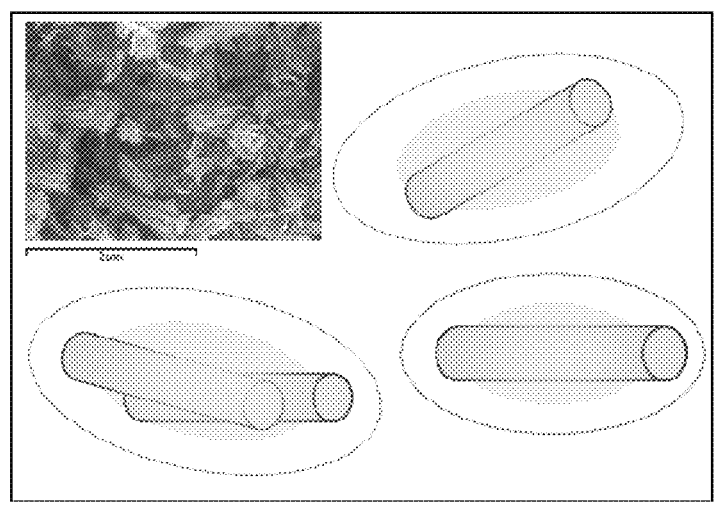
FIG. 4 shows an electron microscopy photograph of a secondary precursor prepared in Example 1 of the present invention, and a schematic shape of a core portion and a shell portion.

From FIG. 3, it can be seen that as the contents of Ni and Co in the shell portion of the secondary precursor to the core portion corresponding to the primary precursor increase, the core-shell structure was formed.

Example 2

A lithium metal oxide composite was synthesized in the same method as Example 1 except that a surface of a primary precursor was coated with polysaccharide and then thermally treated at 300° C.

Example 3

A lithium metal oxide composite was synthesized in the same method as Example 1 except that a surface of a primary precursor was coated with carbon black (Degussa DSF-100) and then thermally treated at 300° C.

Example 4

A lithium metal oxide composite was synthesized in the same method as Example 1 except that a secondary precursor was obtained by mixing 200 mM of an aqueous solution containing a manganese salt, a nickel salt, and a cobalt salt, and 40 mM of an ammonia aqueous solution, and lithium carbonate ($Li_2CO_3$) and the secondary precursor were mixed in a molar ratio of 1.5:1.

Example 5

A lithium metal oxide composite was synthesized in the same method as Example 1 except that a primary precursor was thermally treated at 200° C.

Example 6

A lithium metal oxide composite was synthesized in the same method as Example 1 except that lithium carbonate ($Li_2CO_3$) and the secondary precursor of Example 4 were mixed in a molar ratio of 3:1.

Example 7

A lithium metal oxide composite was synthesized in the same method as Example 1 except that the primary precursor in Example 3 was thermally treated at 500° C.

Example 8

A lithium metal oxide composite was synthesized in the same method as Example 1 except that a thickness ratio of the core portion to the shell portion was 1:0.05.

Example 9

A lithium metal oxide composite was synthesized in the same method as Example 1 except that a thickness ratio of the core portion to the shell portion was 1:12.

Example 10

A lithium metal oxide composite was synthesized in the same method as Example 1 except that a weight ratio of the manganese metal compound to the three component system metal compound was 1:0.2.

Example 11

A lithium metal oxide composite was synthesized in the same method as Example 1 except that a weight ratio of the manganese metal compound and the three component system metal compound was 1:30.

Comparative Example 1

50 mM of a manganese salt aqueous solution, 50 mM of an ammonium persulfate, and 10 mM of potassium hydroxide were mixed to obtain a mixture, and pH of the mixture was regulated to 5 to precipitate a manganese oxide ($MnO_2$) shaped in a needle. The precipitate was washed with water and then dried to synthesize a precursor. The synthesized precursor was mixed with lithium carbonate ($Li_2CO_3$) in a ratio of 1:2, and the mixture was fired for 12 hours at 850° C. to obtain a lithium metal oxide (A).

100 mM of an aqueous solution containing a manganese salt, a nickel salt and a cobalt salt and 200 mM of an ammonia aqueous solution were mixed in a coprecipitation reactor to obtain a mixture, and pH of the obtained mixture was regulated to 10 to 11 to precipitate the precursor. The precipitate was washed with water and then dried to synthesize a precursor. The obtained precursor was mixed with lithium carbonate to obtain a lithium metal oxide (B).

The synthesized lithium metal oxides A and B were mixed in a proper ratio to form a lithium metal oxide mixture (A+B).

Comparative Example 2

$Li_2CO_3$ and $MnO_2$ were mixed in a molar ratio of 1:2 to obtain a mixture, and the mixture was first thermally treated for 6 hours at 300° C. and then secondly thermally treated for 6 hours at 850° C. to obtain a manganese lithium metal oxide (A).

$MnO_2$, $NiCO_3$, and $Co(OH)_2$ were mixed in a solid phase in the same molar ratio to obtain a primary mixture, the obtained mixture was mixed with $Li_2CO_3$ in a molar ratio of 1:2 to obtain a secondary mixture, and the secondary mixture was thermally treated for 12 hours at 850° C. to obtain a three component system lithium metal oxide (B).

The obtained lithium metal oxides A and B were mixed in a ratio of 1:2, and then milled to form a lithium metal oxide mixture composed of uniformly shaped particles.

The positive electrode active materials obtained in Examples and Comparative Examples were mixed with Denka Black as a conductive material, and a PVDF binder in a ratio of 94:3:3 to obtain a mixture, and then the obtained mixture was coated on an Al foil to prepare a positive electrode. Thereafter, a lithium metal as a negative electrode, and an ethylene carbonate(EC)/ethyl methyl carbonate (EMC)/diethyl carbonate (DEC)(=5:3:2) solution in which 1.3M $LiPF_6$ is dissolved were used to prepare a coil cell.

Battery capacity, tap density, and life cycle characteristics of the respective coin cells were measured, and measured results are shown in below table 1. The battery capacity was measured in the standard of 0.1 C discharge capacity, the life cycle characteristics was transcribed as the number of charging and discharging for maintenance of 90% capacity to one time capacity in the standard of 1 C, and high temperature life cycle characteristic was evaluated in a high temperature and constant temperature chamber of 60° C. in the course of charging/discharging. 3 g of positive electrode active material powders obtained in Examples and Comparative Examples were put in 10 ml of cylinders and, after tapping of 2000 times, volumes were measured to obtain tap densities.

TABLE 1

| Item | Capacity | Tap Density | High Temperature Life cycle Characteristic (60) |
|---|---|---|---|
| Example 1 | 180 mAh/g | 2.4 g/cc | 38 times |
| Example 2 | 178 mAh/g | 2.3 g/cc | 42 times |
| Example 3 | 182 mAh/g | 2.2 g/cc | 40 times |
| Example 4 | 198 mAh/g | 2.3 g/cc | 36 times |
| Example 5 | 178 mAh/g | 2.2 g/cc | 41 times |
| Example 6 | 148 mAh/g | 1.9 g/cc | 38 times |
| Example 7 | 168 mAh/g | 2.1 g/cc | 29 times |
| Example 8 | 152 mAh/g | 2.0 g/cc | 42 times |
| Example 9 | 170 mAh/g | 2.4 g/cc | 33 times |
| Example 10 | 150 mAh/g | 2.2 g/cc | 40 times |
| Example 11 | 171 mAh/g | 2.5 g/cc | 30 times |
| Comparative Example 1 | 146 mAh/g | 2.0 g/cc | 18 times |
| Comparative Example 2 | 150 mAh/g | 2.1 g/cc | 22 times |

From Table above, it could be seen that the capacity, tap density and high temperature life cycle characteristic of batteries prepared using a lithium metal oxide composite of the present invention were superior to those in Comparative Examples.

According to the present invention, a lithium metal oxide is formed in a single form including a core portion of an Mn metal compound and a shell portion of a three component system metal compound to secure a high capacity and high stability for a battery, and enhance an energy density per volume, a life cycle characteristic and durability.

Also, since the lithium metal oxides are non-uniformly mixed, defects are not formed, a process may be simplified to save the costs, and a tap density may be enhanced to realize a high capacity.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A lithium metal oxide composite for a lithium secondary battery, comprising:
   a core portion formed of a Mn metal compound, the core portion having a surface coating layer formed of polysaccharide or a carbon black, and
   a shell portion on the surface coating layer such that the surface coating layer is between the core portion and the shell portion, the shell portion being formed of a three-component system metal compound at an outside of the core portion.

2. The lithium metal oxide composite of claim 1, wherein the Mn metal compound of the core portion comprise one or more selected from the group consisting of $Mn(OH)_2$, $MnCO_3$, $MnO$, $MnO_2$ and $Mn_2O_3$.

3. The lithium metal oxide composite of claim 1, wherein the three-component system metal compound of the shell portion is expressed by a formula of $Mn_xNi_yM_z(OH)_2$ (where 0≤x≤1, 0≤y≤1, 0≤z≤1, M=Co, Zr, Al, Mg, Ag, or Mo).

4. The lithium metal oxide composite of claim 1, wherein the core portion is shaped as a needle.

5. The lithium metal oxide composite of claim 1, wherein a ratio of a thickness of the core portion to a thickness of the shell portion is in a range of 1:0.05 to 1:12.

6. The lithium metal oxide composite of claim 1, wherein a weight ratio of the Mn metal compound to the three-component system metal compound is in a range of 1:0.5 to 1:20.

7. A method of preparing a lithium metal oxide composite for a lithium secondary battery, the method comprising:
   mixing a solution containing an Mn metal salt aqueous solution, a chelate agent, and a pH regulator to precipitate a primary precursor;
   forming a surface coating layer of polysaccharide or a carbon black on the primary precursor;
   thermally treating the obtained surface coated primary precursor;
   mixing the thermally treated primary precursor with a three component system metal salt aqueous solution, a chelate agent, and a pH regulator to precipitate a secondary precursor; and
   mixing the obtained secondary precursor with a lithium-containing compound to synthesize a powder via a firing.

8. The method of claim 7, wherein the thermal treating is performed at a temperature ranging from 200° C. to 400° C.

9. The method of claim 7, wherein forming the surface coating layer of polysaccharide or the carbon black on the primary precursor includes coating a surface of the primary precursor followed by the thermally treating of the primary precursor.

10. The method of claim 7, wherein a mixing molar ratio of the lithium containing compound and the secondary precursor is in a range of 1:1 to 2:1.

11. A lithium secondary battery comprising a lithium metal oxide composite for a lithium secondary battery of claim 1.

12. The lithium metal oxide composite of claim 1, wherein the surface coating layer formed of polysaccharide or a carbon black is uniformly distributed on a surface of the core portion.

13. The lithium metal oxide composite of claim 1, wherein the three-component system metal compound includes Mn, Ni, and Co, Zr, Al, Mg, Ag, or Mo.

* * * * *